(12) United States Patent
Boutet et al.

(10) Patent No.: US 11,358,885 B2
(45) Date of Patent: Jun. 14, 2022

(54) METHOD AND DEVICE FOR TREATING ACROLEIN REACTOR WASTEWATER

(71) Applicant: Bluestar Adisseo Nanjing Co., Ltd., Jiangsu (CN)

(72) Inventors: Julien Boutet, Nanjing Jiangsu (CN); Lei Niu, Nanjing Jiangsu (CN)

(73) Assignee: Bluestar Adisseo Nanjing Co., Ltd., Jiangsu (CN)

(*) Notice: Subject to any disclaimer, the term of this patent is extended or adjusted under 35 U.S.C. 154(b) by 4 days.

(21) Appl. No.: 17/043,919

(22) PCT Filed: Mar. 18, 2019

(86) PCT No.: PCT/CN2019/078511
§ 371 (c)(1),
(2) Date: Dec. 15, 2020

(87) PCT Pub. No.: WO2019/192313
PCT Pub. Date: Oct. 10, 2019

(65) Prior Publication Data
US 2021/0107815 A1  Apr. 15, 2021

(30) Foreign Application Priority Data
Apr. 4, 2018  (CN) .......................... 201810309145.8

(51) Int. Cl.
*C02F 1/66*  (2006.01)
*C02F 3/28*  (2006.01)
(Continued)

(52) U.S. Cl.
CPC ................ *C02F 1/66* (2013.01); *B01D 35/02* (2013.01); *C02F 3/2806* (2013.01);
(Continued)

(58) Field of Classification Search
CPC ........ C02F 1/66; C02F 3/2806; C02F 3/2893; C02F 3/30; C02F 2101/34; C02F 2103/36;
(Continued)

(56) References Cited

U.S. PATENT DOCUMENTS 5,540,840 A * 7/1996 Heitkamp ................ C02F 3/085
                                                            210/617
6,936,177 B2 * 8/2005 Yada ......................... C02F 1/52
                                                            210/726
(Continued)

FOREIGN PATENT DOCUMENTS

CN         1948189 A      4/2007
CN       101333050 A     12/2008
(Continued)

OTHER PUBLICATIONS

International search report and English Translation of the International Search Report of corresponding PCT application (PCT/CN2019/078511), dated Jun. 12, 2019, 6 pages.
(Continued)

*Primary Examiner* — Fred Prince
(74) *Attorney, Agent, or Firm* — Cooper Legal Group, LLC

(57) ABSTRACT

A method for treating acrolein reactor wastewater, comprising the steps of: S1. mixing acrolein reactor wastewater and a carbonate aqueous solution to obtain a mixed solution, wherein the acrolein reactor wastewater has a pH value of less than 2 and contains 500 ppm to 3,000 ppm of acrolein, 50 ppm to 800 ppm of allyl alcohol, 40,000 ppm to 100,000 ppm of acrylic acid, 10,000 ppm to 30,000 ppm of formaldehyde, 3,000 ppm to 10,000 ppm of acetic acid and 3,000 ppm to 8,000 ppm of maleic acid; and the mixed solution has a pH value of 4 to 6, a COD concentration ranging from 7,500 ppm to 30,000 ppm, and a formaldehyde concentra-
(Continued)

S1. mixing acrolein reactor wastewater and a carbonate aqueous solution to obtain a mixed solution S2. conveying the mixed solution obtained in step S1 to an anaerobic reactor for biochemical treatment S3. conveying a solution treated in step S2 to an aerobic biochemical tank for treatment tion ranging from 800 ppm to 4,000 ppm; S2. conveying the mixed solution obtained in step S1 to an anaerobic reactor (4) for biochemical treatment; and S3. conveying the solution treated in step S2 to an aerobic biochemical tank (5) for treatment; and reflowing at least one part of the solution treated in step S2 and/or S3 to step S2. Also provided is a device for treating acrolein reactor wastewater.

20 Claims, 2 Drawing Sheets

(51) Int. Cl.
    *C02F 3/30* (2006.01)
    *C02F 11/04* (2006.01)
    *C02F 11/12* (2019.01)
    *B01D 35/02* (2006.01)
    *C02F 101/34* (2006.01)
    *C02F 103/36* (2006.01)
    *C02F 11/127* (2019.01)

(52) U.S. Cl.
    CPC .............. *C02F 3/2893* (2013.01); *C02F 3/30* (2013.01); *C02F 11/04* (2013.01); *C02F 3/2846* (2013.01); *C02F 11/127* (2013.01); *C02F 2101/34* (2013.01); *C02F 2103/36* (2013.01); *C02F 2209/02* (2013.01); *C02F 2209/06* (2013.01); *C02F 2301/046* (2013.01); *Y02E 50/30* (2013.01)

(58) Field of Classification Search
    CPC .............. C02F 2209/02; C02F 2209/06; C02F 2301/046; C02F 3/2846; C02F 11/127; C02F 11/04; Y02E 50/30; B01D 35/02
    USPC ....... 210/605, 603, 615, 616, 617, 631, 259, 210/612
    See application file for complete search history.

(56) References Cited

U.S. PATENT DOCUMENTS

| | | | |
|---|---|---|---|
| 2012/0302797 | A1 | 11/2012 | Devaux et al. |
| 2012/0305479 | A1 | 12/2012 | Falatko et al. |
| 2013/0295509 | A1 | 11/2013 | Finkeldei et al. |

FOREIGN PATENT DOCUMENTS

| | | | |
|---|---|---|---|
| CN | 102491581 | A | 11/2011 |
| CN | 104787983 | A | 4/2015 |
| CN | 204803179 | U | 11/2015 |
| CN | 106277554 | A | 1/2017 |
| CN | 108409044 | A | 8/2018 |
| JP | S53055662 | A | 5/1978 |
| JP | H02078493 | A | 3/1990 |
| JP | 06170390 | A | 6/1994 |
| JP | H07016594 | A | 1/1995 |
| JP | H11077087 | A | 3/1999 |
| JP | 2002307092 | A | 10/2002 |
| JP | 2006187703 | A | 7/2006 |
| JP | 2013513593 | A | 4/2013 |
| JP | 2014511343 | A | 5/2014 |
| KR | 101127640 | B1 | 3/2012 |
| KR | 101426440 | B1 | 8/2014 |
| SU | 1717556 | A1 | 3/1992 |

OTHER PUBLICATIONS

Written Opinion and English Translation of the Written Opinion of corresponding PCT application (PCT/CN2019/078511), dated Jun. 12, 2019, 8 pages.
1st Office Action for corresponding CN application (CN201810309145.8), dated Oct. 15, 2018, 17 pages.
2nd Office Action for corresponding CN application (CN201810309145.8), dated Dec. 14, 2018, 5 pages.
Notice of Reasons for Refusal and Search Report of corresponding JP Application (JP2020-554216) dated Nov. 24, 2021, 37 pages.
Notification of Reason for Refusal of corresponding KR Application 10-2020-7031933, dated Apr. 11, 2022, 13 pages.

\* cited by examiner

METHOD AND DEVICE FOR TREATING ACROLEIN REACTOR WASTEWATER

CROSS-REFERENCE TO RELATED APPLICATIONS

This application is a U.S. national phase application of PCT Patent Application Serial No. PCT/CN2019/078511, filed on Mar. 18, 2019, and claims priority to and benefit of Chinese Patent Application No. 201810309145.8, filed on Apr. 4, 2018 in the National Intellectual Property Administration, P.R.C. PCT Patent Application Serial No. PCT/CN2019/078511 and Chinese Patent Application No. 201810309145.8 are incorporated herein by reference in their entireties.

TECHNICAL FIELD

The invention belongs to the technical field of wastewater treatment, and particularly relates to a method and a device for treating acrolein reactor wastewater.

BACKGROUND ART

An important link in the production process of acrolein includes the production of acrolein by oxidizing propylene as a raw material; the wastewater produced in the production process contains a high content of organic matter including acrolein, formaldehyde, acetic acid, acrylic acid, allyl alcohol, maleic acid and the like, which only can be discharged after wastewater treatment; a traditional method of treating acrolein reactor wastewater is incineration, which has the disadvantages such as high natural gas consumption, large energy consumption, and high equipment maintenance costs.

A biochemical method for wastewater treatment has the advantages of being low in cost, safe and reliable, and the generated biogas can also be used as a renewable fuel gas supply. However, the acrolein reactor wastewater is strongly acidic and contains formaldehyde, so it is not suitable to directly use the biochemical method, as the biochemical treatment cannot be conducted in a strong acid environment, and formaldehyde is toxic to the anaerobic microorganisms in the anaerobic reactor, resulting in a significant decrease of wastewater treatment effect, and being unable to meet the emission standards. The use of strong alkali such as sodium hydroxide for neutralization and adjusting the pH to 8-9 may facilitate the biochemical treatment, but sodium hydroxide is expensive, and neutralization will cause an increase in salt content in the wastewater, which not only affects the activity of bacteria in the biochemical treatment, but also requires additional treatment steps, resulting in increased costs.

SUMMARY OF THE INVENTION

The invention provides a method and a device for treating acrolein reactor wastewater.

In order to solve the above problems, the present invention provides the following technical schemes.

In one aspect, a method for treating acrolein reactor wastewater is provided, comprising the steps of:

S1. mixing acrolein reactor wastewater and a carbonate aqueous solution to obtain a mixed solution, wherein the acrolein reactor wastewater has a pH value of less than 2, and contains: 500 ppm to 3,000 ppm of acrolein, 50 ppm to 800 ppm of allyl alcohol, 40,000 ppm to 100,000 ppm of acrylic acid, 10,000 ppm to 30,000 ppm of formaldehyde, 3,000 ppm to 10,000 ppm of acetic acid and 3,000 ppm to 8,000 ppm of maleic acid; and the mixed solution has a pH value ranging from 4 to 6, a COD concentration ranging from 7,500 ppm to 30,000 ppm, and a formaldehyde concentration ranging from 800 ppm to 4,000 ppm;

S2. conveying the mixed solution obtained in step S1 to an anaerobic reactor for biochemical treatment; and S3. conveying the solution treated in step S2 to an aerobic biochemical tank for treatment;

optionally, reflowing at least one part of the solution treated in step S2 and/or S3 to step S2.

In some embodiments, wherein the acrolein reactor wastewater in step S1 contains less than 50 ppm salt and is substantially free of sulfate.

In some embodiments, wherein the carbonate aqueous solution in step S1 has a pH value ranging from 8 to 9, a COD concentration between 100 ppm and 600 ppm, and alkalinity (calculated as $CaCO_3$) between 4,000 ppm and 7,000 ppm, in particular, has a temperature between 20° C. and 45° C.

In some embodiments, wherein the mixed solution in step S1 has a COD concentration between 12,000 ppm and 25,000 ppm.

In some embodiments, wherein the mixed solution in step S1 has a formaldehyde concentration between 1,200 ppm and 3,600 ppm.

In some embodiments, wherein the mixed solution in step S1 has alkalinity (calculated as $CaCO_3$) less than 3000 ppm.

In some embodiments, wherein the acrolein reactor wastewater in step S1 has a COD concentration between 60,000 ppm and 200,000 ppm.

In some embodiments, wherein the carbonate aqueous solution in step S1 contains sodium carbonate and/or sodium bicarbonate, in particular, the carbonate aqueous solution is wastewater containing sodium carbonate and/or sodium bicarbonate.

In some embodiments, wherein at least a part of the solution treated in step S2 and/or S3 is mixed with the mixed solution obtained in step S1 to obtain a mixture having a pH ranging from 5 to 6.5, and then the mixture is conveyed to an anaerobic reactor in step S2 for biochemical reaction.

In some embodiments, wherein after said step S2, a COD removal rate is 70% or more, a formaldehyde removal rate is 98% or more, in particular, a COD removal rate is 80% or more and a formaldehyde removal rate is 99% or more.

In some embodiments, wherein biogas containing $CH_4$ and $CO_2$ is obtained in said step S2, wherein $CH_4$ has a mass fraction ranging from 70% to 90%, $CO_2$ has a mass fraction ranging from 10% to 30%, in particular, $CH_4$ and $CO_2$ in the biogas has a total mass fraction of greater than 99%, and/or $H_2S$ has a concentration of less than 200 ppm.

In some embodiments, wherein after said step S3, a COD removal rate is 95% or more, in particular, a COD removal rate is 98% or more; and a formaldehyde removal rate is 99.5% or more, in particular, a formaldehyde removal rate is 99.9% or more.

In some embodiments, wherein after said step S3, the treated wastewater has a pH value between 6 and 9, and contains less than 800 ppm of COD, less than 5 ppm of formaldehyde, less than 50 ppm of $NH_3$—N, less than 15 ppm of total nitrogen, and less than 2 ppm of total phosphate.

In some embodiments, wherein a reaction temperature in said step S2 is from 30° C. to 45° C., and a reaction temperature in said step S3 is from 10° C. to 35° C.

In yet another aspect, a device for treating acrolein reactor wastewater is provided, comprising a wastewater storage tank, a carbonate aqueous solution storage tank, a wastewater conditioning tank, an anaerobic reactor, an aerobic biochemical tank, a sedimentation tank, a secondary sedimentation tank, and an exhaust pipe, wherein the wastewater storage tank and the carbonate aqueous solution storage tank are respectively in fluid communication with the wastewater conditioning tank;

the wastewater conditioning tank, the anaerobic reactor, the aerobic biochemical tank, the sedimentation tank and the secondary sedimentation tank are sequentially in fluid communication;

the anaerobic reactor is provided with a biogas outlet; and one or more of the wastewater storage tank, the carbonate aqueous solution storage tank, the wastewater conditioning tank, the anaerobic reactor and the aerobic biochemical tank are provided with exhaust outlets connected to exhaust pipes.

In some embodiments, in the device, the anaerobic reactor comprises an anaerobic granular sludge bed and an anaerobic sludge tank, wherein the anaerobic granular sludge bed is in fluid communication with the wastewater conditioning tank and the aerobic biochemical tank, the anaerobic sludge tank is in fluid communication with the anaerobic granular sludge bed, the anaerobic granular sludge bed is provided with a biogas outlet, and the anaerobic sludge tank is provided with an exhaust outlet connected to an exhaust pipe, and/or the aerobic biochemical tank is an aeration sludge bed.

In some embodiments, the device further comprises an anaerobic conditioning tank disposed between the wastewater conditioning tank and the anaerobic reactor, wherein the anaerobic conditioning tank is in fluid communication with an outlet of the wastewater conditioning tank and an inlet of the anaerobic reactor respectively, and in fluid communication with outlets of one or more of the anaerobic reactor, the aerobic biochemical tank, the sedimentation tank, and the secondary sedimentation tank.

In some embodiments, the device further comprises an anaerobic conditioning tank disposed between the wastewater conditioning tank and the anaerobic granular sludge bed, wherein the anaerobic conditioning tank is in fluid communication with an outlet of the wastewater conditioning tank and an inlet of the anaerobic granular sludge bed respectively, and in fluid communication with outlets of one or more of the anaerobic granular sludge bed, the aerobic biochemical tank, the sedimentation tank, and the secondary sedimentation tank.

In some embodiments, an outlet of the sedimentation tank in the device is connected to an inlet of the aerobic biochemical tank via a pipe and a circulation pump.

In some embodiments, in the device, a pH analyzer and/or a thermometer are disposed within the wastewater conditioning tank.

In some embodiments, in the device, an outlet of the exhaust pipe is connected to a combustor and/or a filter and/or a scrubber.

DETAILED DESCRIPTION OF THE INVENTION

The present application relates to a method and a device for the continuous treatment of acrolein reactor wastewater.

In the present application, the density of the liquid flow under the conditions used may be considered to be approximately 1000 g/L, i.e. mg/L can be used interchangeably with ppm, unless otherwise specified.

In this application, percentages are based on mass unless otherwise specified.

Figure 1:
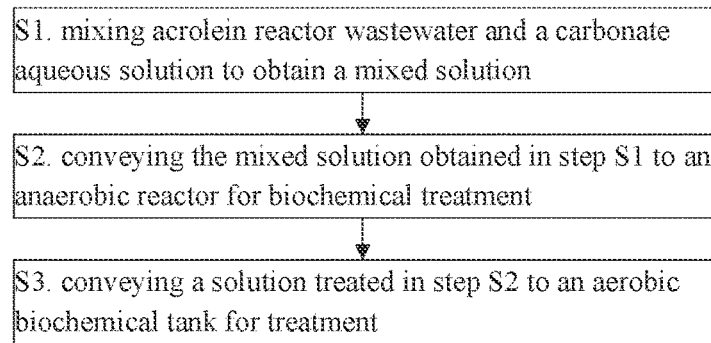
FIG. 1 is a flow diagram of a method for treating acrolein reactor wastewater according to an embodiment of the present application.

According to one aspect of the present application, there is provided a method for treating acrolein reactor wastewater, as shown in FIG. 1, comprising the steps of:

S1. mixing acrolein reactor wastewater and a carbonate aqueous solution to obtain a mixed solution, wherein the acrolein reactor wastewater has a pH value of less than 2 and contains 500 ppm to 3,000 ppm of acrolein, 50 ppm to 800 ppm of allyl alcohol, 40,000 ppm to 100,000 ppm of acrylic acid, 10,000 ppm to 30,000 ppm of formaldehyde, 3,000 ppm to 10,000 ppm of acetic acid and 3,000 ppm to 8,000 ppm of maleic acid; and the mixed solution has a pH value ranging from 4 to 6, a COD concentration ranging from 7,500 ppm to 30,000 ppm, and a formaldehyde concentration ranging from 800 ppm to 4,000 ppm;

S2. conveying the mixed solution obtained in step S1 to an anaerobic reactor for biochemical treatment; and S3. conveying the solution treated in step S2 to an aerobic biochemical tank for treatment;

optionally, reflowing at least one part of the solution treated in step S2 and/or S3 to step S2.

In the present application, "acrolein reactor wastewater" refers to the reactor wastewater produced in a process for producing acrolein by oxidizing propylene as a raw material, wherein the wastewater is a strongly acidic solution and contains a high content of organic matter including acrolein, formaldehyde, acetic acid, acrylic acid, allyl alcohol, maleic acid and the like. In some embodiments, the acrolein reactor wastewater has a pH of less than 2, e.g., in a range of 1 to 2, and contains 500 ppm to 3,000 ppm of acrolein, 50 ppm to 800 ppm of allyl alcohol, 40,000 ppm to 100,000 ppm of acrylic acid, 10,000 ppm to 30,000 ppm of formaldehyde, 3000 ppm to 10,000 ppm of acetic acid and 3,000 ppm to 8,000 ppm of maleic acid, and may also contain other impurities such as acetaldehyde, acetone, and hydroquinone at very low levels. In some embodiments, the acrolein reactor wastewater contains 800 ppm to 2,000 ppm of acrolein. In some embodiments, the acrolein reactor wastewater contains 150 ppm to 650 ppm of allyl alcohol. In some embodiments, the acrolein reactor wastewater contains 60,000 ppm to 90,000 ppm of acrylic acid. In some embodiments, the acrolein reactor wastewater contains 15,000 ppm to 22,000 ppm of formaldehyde. In some embodiments, the acrolein reactor wastewater contains 5,000 ppm to 8,000 ppm acetic acid. In some embodiments, the acrolein reactor wastewater contains 4,000 ppm to 6,000 ppm maleic acid.

In some embodiments, the acrolein reactor wastewater has a COD concentration between 60,000 ppm and 200,000 ppm. In some embodiments, the acrolein reactor wastewater has a COD concentration between 80,000 ppm and 180,000 ppm. In some embodiments, the acrolein reactor wastewater has a COD concentration of about 130,000 ppm, about 145,000 ppm, or about 178,000 ppm.

The value of COD in the present application is calculated based on the concentration of the component and its COD conversion coefficient.

In some embodiments, the acrolein reactor wastewater contains salts in an amount of less than 50 ppm and is substantially free of sulfate.

As strong acid environment and high level of COD and formaldehyde do not facilitate the anaerobic biochemical reaction, for most of the existing process, strong alkali such as NaOH is used for neutralization and adjusting pH value to 8 to 10, and Cannizzaro reaction is conducted for degradation of formaldehyde followed by subsequent treatment, so that high content of salt (Na salt) is produced, which will damage the activity of bacteria in the biochemical treatment due to intracellular pressure and kill the bacteria; meanwhile the treatment cost is high due to expensiveness of NaOH, and the process is also complicated.

According to the method, by mixing the acrolein reactor wastewater with the carbonate aqueous solution, the pH value, COD, and formaldehyde content of the wastewater can be adjusted at the same time, so as to facilitate the subsequent removal of organic matter through anaerobic and aerobic biochemical treatment to meet the emission standards. The neutralization and dilution effects can be realized in one step by using carbonate aqueous solution, and the process is simple. Carbonate is used to produce carbon dioxide in the neutralization reaction, which has no effect on the activity of bacteria. Compared with a neutralization reaction using NaOH, the method has the advantages that the reaction is milder, the reaction heat and the temperature are easier to control, the amount of salt generated is reduced, which facilitates subsequent biochemical reactions even more.

In some embodiments, the carbonate aqueous solution has a pH value between 8 and 9, a COD concentration between 100 ppm and 600 ppm, alkalinity (calculate as $CaCO_3$) between 4,000 ppm and 7,000 ppm, specifically, a temperature between 20° C. and 45° C. In some embodiments, the alkalinity (calculate as $CaCO_3$) of the carbonate aqueous solution is from 4,500 ppm to 6,000 ppm.

In some embodiments, the carbonate in the carbonate aqueous solution is one or two selected from sodium carbonate and sodium bicarbonate. In particular, wastewater containing sodium carbonate and/or sodium bicarbonate can be used as carbonate aqueous solution to reduce the total wastewater discharge.

In some embodiments, the carbonate aqueous solution is substantially free of sulfate.

Since the acrolein reactor wastewater and/or the carbonate aqueous solution are substantially free of sulfate, the content of hydrogen sulfide, which not only seriously affects the activity of bacteria in biochemical treatment, but also requires a subsequent desulfurization step for further treatment, in the biogas generated in step S2 can be reduced.

In the present invention, said "substantially free of sulfate" means that the sulfate content is 50 ppm or less, specifically 30 ppm or less, more specifically 20 ppm or less.

In some embodiments, no additional alkali is added to the process of the present invention other than the carbonate aqueous solution used in Step S1, including, but not limited to, sodium hydroxide, potassium hydroxide, sodium carbonate, potassium carbonate, sodium bicarbonate, potassium bicarbonate, and the like.

In the method for treating acrolein reactor wastewater of the present invention, acrolein reactor wastewater is mixed with an carbonate aqueous solution in step S1 to obtain a mixed solution having a pH value ranging from 4 to 6, a COD concentration ranging from 7,500 ppm to 30,000 ppm, and a formaldehyde concentration ranging from 800 ppm to 4,000 ppm. In some embodiments, the mixed solution has a pH value of about 5. Optionally, at least a part of the solution after anaerobic and/or aerobic biochemical treatment in the wastewater treatment process reflows to step S2 as dilution water for further adjustment of the pH value and concentrations of COD and formaldehyde in the wastewater. In some embodiments, the dilution water has a pH value ranging from 6 to 9. In some embodiments, the dilution water has a COD concentration of less than 3,000 ppm, specifically less than 2,000 ppm, more specifically less than 1,000 ppm, and still more specifically less than 500 ppm. In some embodiments, the dilution water has a formaldehyde concentration of less than 30 ppm, more specifically less than 15 ppm, and still more specifically less than 5 ppm. In some embodiments, at least a part of the solution treated in step S2 and/or S3 is mixed with the mixed solution obtained in step S1 to obtain a mixture having a pH value in a range of 5 to 6.5, and then the mixture is transferred to the anaerobic reactor in step S2 for biochemical reaction.

In some embodiments, the mixed solution has a COD concentration between 7,800 ppm and 26,000 ppm, such as between 12,000 and 25,000 ppm, specifically about 7,800 ppm, about 14,000 ppm, about 16,000 ppm, about 20,000 ppm, about 22,000 ppm, or about 26,000 ppm. In some embodiments, the mixed solution has a formaldehyde concentration ranging from 1,200 ppm to 3,600 ppm, specifically about 3,600 ppm, about 3,400 ppm, about 3,000 ppm, about 2,500 ppm, about 2,300 ppm, about 2,000 ppm, about 1,700 ppm, about 1,600 ppm, or about 1,200 ppm. In some embodiments, the mixed solution has alkalinity (calculate as $CaCO_3$) less than 3,000 ppm, specifically from 2,000 ppm to 3,000 ppm.

After the pH value, the concentrations of COD and formaldehyde in the acrolein reactor wastewater are adjusted through step S, the obtained solution is conveyed to an anaerobic reactor for biochemical treatment.

In the anaerobic treatment, organic matters (COD) are eliminated by reducing the COD to biogas under anaerobic conditions, with at least 80% of the COD reduced to biogas. In some embodiments, about 85% of the COD is reduced to biogas. The biogas contains $CH_4$ and $CO_2$, and also contains very small amounts of other components such as $H_2S$, wherein $CH_4$ has a mass fraction ranging from 70% to 80%, $CO_2$ has a mass fraction ranging from 20% to 30%, and $H_2S$ has a concentration of less than 200 ppm. In some embodiments, the biogas contains about 75% $CH_4$ and 25% $CO_2$ and a concentration of $H_2S$ is less than 200 ppm. The biogas may be recycled as an energy source such as a heat source.

In some embodiments, the anaerobic reactor comprises a granular sludge-based anaerobic granular sludge bed; wherein the granular sludge has excellent characteristics, with settleability ranging from 10 m/hr to 100 m/hr, a sludge volume index ranging from 10 mL/g to 20 mL/g, a sludge concentration up to 50,000 mgSS/L to 80,000 mgSS/L, and activity up to 1 gCOD/gVSS·d to 1.5 gCOD/gVSS·d; the reactor may be operated at a loading rate ranging from 4 kg $COD/m^3 \cdot d$ to 10 kg $COD/m^3 \cdot d$.

In some embodiments, the anaerobic reaction is mesophilic digestion with a reaction temperature ranging from 30° C. to 45° C. The wastewater to be treated flows in the anaerobic granular sludge bed from the bottom, and is subjected to reaction in the process of flowing upward through the sludge bed, and organic matters are degraded and removed to generate biogas. The biogas is collected via a gas-liquid-solid separation device on the top, the sludge is returned to the sludge bed, and the treated solution is discharged from the reactor.

As the anaerobic reaction proceeds, acids such as acetic acid and acrylic acid in the organic matters are removed to generate biogas and increase the pH value. The pH value of the wastewater subjected to anaerobic treatment is raised to 6 to 7. In some embodiments, at least a part of the wastewater subjected to anaerobic treatment reflows for mixing with the mixed solution obtained in step S1 to adjust its pH value and concentrations of COD and formaldehyde.

In some embodiments, the anaerobic biochemical treatment results in a COD removal rate of 70% or more and a formaldehyde removal rate of 98% or more, specifically a COD removal rate of 80% or more and a formaldehyde removal rate of 99% or more. In some embodiments, the anaerobic biochemical treatment results in a COD concentration less than 6,000 ppm, specifically less than 4,500 ppm, more specifically less than 3,000 ppm. In some embodiments, the anaerobic biochemical treatment results in a formaldehyde concentration less than 40 ppm, specifically less than 25 ppm, more specifically less than 15 ppm.

The effluent from the anaerobic reactor is conveyed to an aerobic biochemical tank for treatment, and an aerobic biochemical reaction is conducted for further removing organic matters. The method of the present invention further comprises a solid-liquid separation step after the biochemical treatment, for example a separation step via sedimentation. In some embodiments, the solution subjected to aerobic biochemical treatment flows into the sedimentation tank to recirculate a part of sludge subjected to sedimentation separation to the aerobic biochemical tank; a certain amount of sludge is discharged into the discharging sludge tank, then the sludge cake is formed by centrifuging, and discarded so as to maintain a stable sludge concentration in the aerobic biochemical tank.

In some embodiments, the aerobic biochemical treatment results in a COD removal rate of 95% or more, specifically a COD removal rate of 98% or more; and results in a formaldehyde removal rate of 99.5% or more, specifically a formaldehyde removal rate of 99.9% or more.

In some embodiments, the anaerobic treatment and aerobic treatment result in a pH value of the wastewater between 6 and 9, such as about 7 or about 8; COD of less than 800 ppm, specifically less than 500 ppm, for example about 300 ppm, 250 ppm, or 150 ppm; formaldehyde of less than 5 ppm, specifically less than 3 ppm; $NH_3$—N of less than 50 ppm, specifically less than 5 ppm; total nitrogen of less than 15 ppm; and total phosphate of less than 2 ppm.

Figure 2:
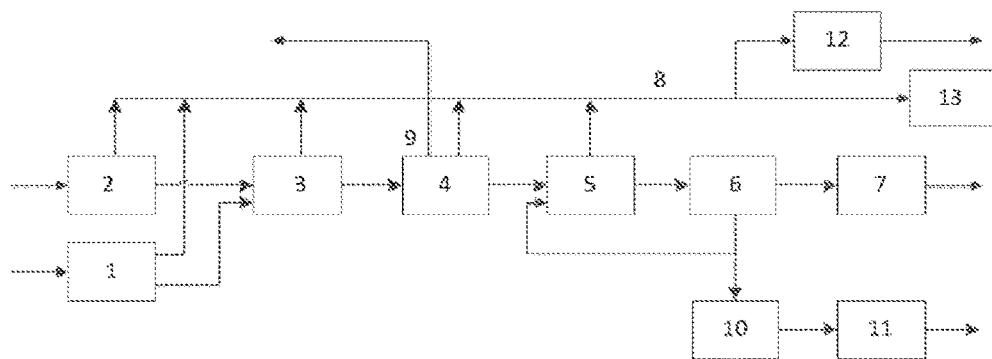
FIG. 2 is a schematic view of a device for treating acrolein reactor wastewater according to an embodiment of the present application; in the figure, 1 is a wastewater storage tank, 2 is a carbonate aqueous solution storage tank, 3 is a wastewater conditioning tank, 4 is an anaerobic reactor, 5 is an aerobic biochemical tank, 6 is a sedimentation tank, 7 is a secondary sedimentation tank, 8 is an exhaust pipe, 9 is a biogas outlet, 10 is a discharging sludge tank, 11 is a centrifuge, 12 is a filter or a scrubber, and 13 is a combustor.

According to another aspect of the present application, a device for treating acrolein reactor wastewater is provided. FIG. 2 shows a schematic diagram of a device for treating acrolein reactor wastewater according to an embodiment of the present application, including a wastewater storage tank 1, a carbonate aqueous solution storage tank 2, a wastewater conditioning tank 3, an anaerobic reactor 4, an aerobic biochemical tank 5, a sedimentation tank 6, a secondary sedimentation tank 7, and an exhaust pipe 8, wherein the wastewater storage tank 1 and the carbonate aqueous solution storage tank 2 are respectively in fluid communication with the wastewater conditioning tank 3, the wastewater conditioning tank 3, the anaerobic reactor 4, the aerobic biochemical tank 5, the sedimentation tank 6 and the secondary sedimentation tank 7 are sequentially in fluid communication;

the anaerobic reactor 4 is provided with a biogas outlet 9; and one or more of the wastewater storage tank 1, the carbonate aqueous solution storage tank 2, the wastewater conditioning tank 3, the anaerobic reactor 4 and the aerobic biochemical tank 5 are provided with exhaust outlets connected to the exhaust pipe 8.

In some embodiments, the device for treating acrolein reactor wastewater further comprises a discharging sludge tank 10, a centrifuge 11, a filter or scrubber 12, and a combustor 13.

In some embodiments, the aerobic biochemical tank 5 is in fluid communication with the sedimentation tank 6. In some embodiments, an outlet of the sedimentation tank 6 is connected to an inlet of the aerobic biochemical tank 5 via a pipe and a circulation pump to achieve recycling of the sludge.

In some embodiments, the sedimentation tank 6 is in communication with the discharging sludge tank 10, which is connected to the centrifuge 11. The solution subjected to aerobic biochemical treatment in the aerobic biochemical tank 5 flows into the sedimentation tank 6 to recirculate a part of sludge subjected to sedimentation separation to the aerobic biochemical tank 5 via a pipe and a circulation pump, a certain amount of sludge is discharged into the discharging sludge tank 10, then the sludge cake is formed by centrifuging through a centrifugal machine 11, and is discarded so as to maintain stable sludge concentration in the aerobic biochemical tank 5.

In some embodiments, a pH analyzer and/or thermometer is provided in the wastewater conditioning tank 3 for detecting the pH and temperature of the wastewater in the wastewater conditioning tank and controlling them within a suitable range.

In some embodiments, an outlet of the exhaust pipe 8 is connected to a filter or scrubber 12 to discharge the exhaust after treatment to avoid air pollution.

In some embodiments, an outlet of the exhaust pipe 8 is connected to a combustor 13, which combusts the exhaust, avoiding direct emission air pollution.

In some embodiments, the aerobic biochemical tank 5 is an aerated sludge bed.

Figure 3:
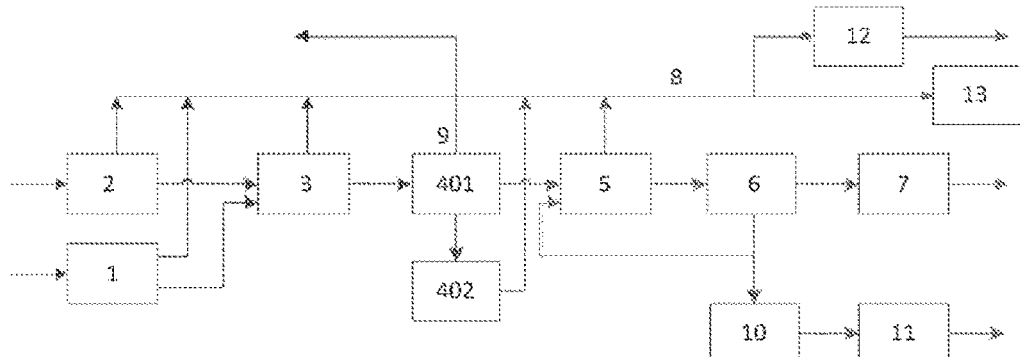
FIG. 3 is a schematic view of a device for treating acrolein reactor wastewater according to an embodiment of the present application; in the figure, 1 is a wastewater storage tank, 2 is a carbonate aqueous solution storage tank, 3 is a wastewater conditioning tank, 401 is an anaerobic granular sludge bed, 402 is an anaerobic sludge tank, 5 is an aerobic biochemical tank, 6 is a sedimentation tank, 7 is a secondary sedimentation tank, 8 is an exhaust pipe, 9 is a biogas outlet, 10 is a discharging sludge tank, 11 is a centrifuge, 12 is a filter or a scrubber, and 13 is a combustor.

As shown in FIG. 3, in some embodiments, the anaerobic reactor 4 includes an anaerobic granular sludge bed 401 and an anaerobic sludge tank 402, wherein the anaerobic granular sludge bed 401 is in fluid communication with the wastewater conditioning tank 3 and the aerobic biochemical tank 5, the anaerobic sludge tank 402 is in fluid communication with the anaerobic granular sludge bed 401, the anaerobic granular sludge bed 401 is provided with a biogas outlet 9, and the anaerobic sludge tank 402 is provided with an exhaust outlet connected to the exhaust pipe 8. The other parts are as described above for FIG. 2.

In some embodiments, an anaerobic conditioning tank disposed between the wastewater conditioning tank and the anaerobic reactor includes two inlets respectively in fluid communication with an outlet of the wastewater conditioning tank and an outlet of one or more of the anaerobic reactor, the aerobic biochemical tank, the sedimentation tank and the secondary sedimentation tank, and two outlets respectively in fluid communication with an inlet of the anaerobic reactor and an inlet of the aerobic biochemical tank. The anaerobic conditioning tank is used for reflowing at least one part of the solution treated in step S2 and/or S3 to step S2. In some embodiments, the anaerobic conditioning tank is used for reflowing at least one part of the wastewater subjected to anaerobic treatment to the anaerobic reactor. In some embodiments, the mixed solution obtained in step S1 is mixed with at least a part of the wastewater subjected to anaerobic treatment via the anaerobic conditioning tank, and the mixture is conveyed to the anaerobic reactor for anaerobic biochemical reaction, that is, at least a part of the treated wastewater (pH 6 to 7) is recirculated within the anaerobic treatment. For the anaerobic reaction, on one hand, the pH and contents of COD and formaldehyde in the mixed solution obtained in step S1 are further adjusted by using the treated wastewater, on the other hand, as the acid in the organic matter is degraded by the anaerobic reaction, the pH is increased, which facilitates the anaerobic biochemical reaction even more.

In some embodiments, the anaerobic conditioning tank is configured to be capable of mixing a part of the treated wastewater with the effluent of the wastewater conditioning tank and conveying the part of the treated wastewater to the aerobic biochemical tank.

Figure 4:
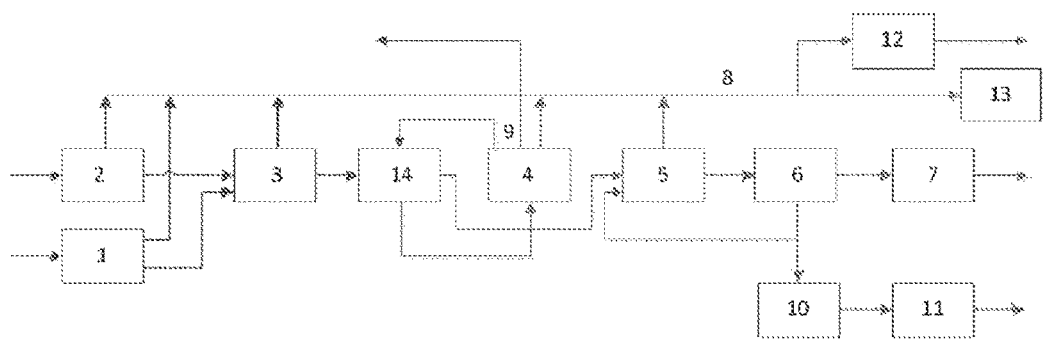
FIG. 4 is a schematic view of a device for treating acrolein reactor wastewater according to an embodiment of the present application; in the figure, 1 is a wastewater storage tank, 2 is a carbonate aqueous solution storage tank, 3 is a wastewater conditioning tank, 4 is an anaerobic reactor, 5 is an aerobic biochemical tank, 6 is a sedimentation tank, 7 is a secondary sedimentation tank, 8 is an exhaust pipe, 9 is a biogas outlet, 10 is a discharging sludge tank, 11 is a centrifuge, 12 is a filter or a scrubber, 13 is a combustor, and 14 is an anaerobic conditioning tank.

FIG. 4 is a schematic diagram of a device for treating acrolein reactor wastewater according to an embodiment of the present application. Wherein, the anaerobic regulation tank 14 includes two inlets in fluid communication with an outlet of the wastewater regulation tank 3 and an outlet of the anaerobic reactor 4 respectively, and two outlets in fluid communication with an inlet of the anaerobic reactor 4 and an inlet of the aerobic biochemical tank 5 respectively. The anaerobic conditioning tank 14 is configured to be capable of mixing a part of the effluent of the anaerobic reactor 4 with the effluent of the wastewater conditioning tank 3, then conveying the part of the effluent of the anaerobic reactor 4 to the anaerobic reactor 4 through the inlet of the anaerobic reactor 4 for anaerobic biochemical reaction, and conveying a part of the effluent of the anaerobic reactor 4 to the aerobic biochemical tank 5 for aerobic treatment. The other parts are as described above for FIG. 2.

In some embodiments, the anaerobic reactor comprises an anaerobic granular sludge bed and an anaerobic sludge tank, and the anaerobic conditioning tank comprises two inlets in fluid communication with an outlet of the wastewater conditioning tank and an outlet of the anaerobic granular sludge bed respectively, and two outlets in fluid communication with an inlet of the anaerobic granular sludge bed and an inlet of the aerobic biochemical tank respectively; that is, at least part of the effluent of the anaerobic granular sludge bed is circulated within the anaerobic conditioning tank and the anaerobic granular sludge bed.

In an embodiment, the anaerobic conditioning tank includes:

a partition plate having a through hole provided inside;

an inlet above the partition plate in fluid communication with an outlet of the anaerobic reactor, and an outlet above the partition plate in fluid communication with an inlet of the aerobic biochemical tank;

an inlet below the partition plate in fluid communication with an outlet of the wastewater conditioning tank, and an outlet below the partition plate in fluid communication with an inlet of the anaerobic reactor; and a mixing device for mixing the solution below the partition plate.

Through the arrangement, the effluent of the anaerobic reactor is conveyed above the partition plate, the effluent of the wastewater conditioning tank is conveyed below the partition plate, the effluent of the anaerobic reactor can enter the part below the partition plate via the through hole, and enter the anaerobic reactor through the outlet below the partition plate for reaction after being mixed with the effluent of the wastewater conditioning tank, for reaction; and the effluent of the anaerobic reactor is conveyed to the aerobic biochemical tank via the outlet above the partition plate, for aerobic treatment. Thereby it is achieved that a part of the effluent of the anaerobic reactor reflows to the anaerobic reactor and the other part is conveyed into the aerobic biochemical tank.

Compared with the prior art, the advantages of the present invention are as follows.

The present invention discloses a continuous treatment process and device for acrolein reactor wastewater, wherein the acrolein reactor wastewater is mixed with a carbonate aqueous solution to adjust pH, and concentrations of COD and formaldehyde; the wastewater meeting discharge standards is obtained after anaerobic and aerobic treatment processes. In the present invention, by mixing the carbonate aqueous solution with the acrolein reactor wastewater, on the one hand, the pH value of the mixed wastewater can be adjusted, and on the other hand, the concentrations of COD and formaldehyde can be reduced. In addition, since the organic acid present in the acrolein reactor wastewater is degraded in the anaerobic reactor, the COD of the wastewater is reduced and the pH value of the wastewater is increased. The pH value of the mixed wastewater can be further increased and the concentrations of COD and formaldehyde in the mixed wastewater can be further reduced by reflowing the wastewater subjected to biochemical reaction, so that the mixed wastewater is more suitable for anaerobic reaction, and the amount of discharged wastewater can be reduced through internal circulation of the treated wastewater. According to the method disclosed by the present invention, the additional addition of alkali, especially caustic soda, to adjust the pH value of the wastewater and increase the content of salt in the wastewater are avoided, which is environmentally friendly, and can effectively reduce the treatment cost of the wastewater.

In the wastewater treatment method provided by the present invention, no additional chemicals are required, and there is no acidification/alkalization reaction, so no salt is produced; in the anaerobic process, most of COD and formaldehyde are removed, and due to the fact that no additional alkali such as caustic soda needs to be added for neutralization reaction, the treatment process has the advantages of no ventilation (electricity saved by 80%), less sludge generated (saved by 85%), and less chemical consumption (saved by 60%), which saves large amount of operation cost that can be reduced to 30% compared with an incineration method; the biogas reduced under the anaerobic condition can also be used for heat recovery, so that resource recycling is realized, and the method is green and environment-friendly.

Through the process provided by the invention, at least 80% of COD is converted into biogas that is recovered as fuel gas, so that the natural gas consumption is reduced.

The process provided by the present invention has high formaldehyde tolerance, and can directly treat wastewater with high concentration of formaldehyde, without pretreatment of high concentration of wastewater or adding other reagents in order to reduce formaldehyde.

According to the device provided by the invention, the acrolein reactor wastewater can be continuously treated, the mixed wastewater with appropriate concentrations of COD and formaldehyde, pH and temperature can be obtained only by mixing, avoiding the addition of additional additives, which is environmental protection and energy conservation; the wastewater treatment is realized and exhaust generated in the wastewater treatment process is properly treated by the device, which realizes heat recovery and is green and environment-friendly.

The invention is further illustrated by the following examples.

The compositions of the acrolein reactor wastewater and carbonate aqueous solutions used in the examples are shown in Tables 1-1 and 2. Table 1-2 shows COD conversion coefficients for each component.

The acrolein reactor wastewater used in the examples had a pH of 1 to 2 and a COD between 60,000 ppm and 200,000 ppm, specifically 133,028 ppm (acrolein reactor wastewater 1), 145,318 ppm (acrolein reactor wastewater 2) and 178,000 ppm respectively in several examples.

TABLE 2

Composition of carbonate aqueous solutions used in the examples

|  | pH | COD (ppm) | Alkalinity (calculated as $CaCO_3$, ppm) |
|---|---|---|---|
| Carbonate aqueous solution 1 | 8.3-9 | 300 | 6,000 |
| Carbonate aqueous solution 2 | 8-8.8 | 200 | 6,000 |

The carbonate aqueous solution used in the examples included sodium carbonate and sodium bicarbonate at a temperature ranging from 25° C. to 42° C.

The dilution water used in the examples was wastewater after anaerobic and aerobic biochemical treatment (reflowing water, COD<500 ppm, formaldehyde <1 ppm, pH between 6 and 9, as shown in Table 3) or was used to dilute a mixed solution of acrolein reactor wastewater and carbonate aqueous solution by reflowing the wastewater subjected to anaerobic treatment.

TABLE 3

Parameters for dilution water

| Parameters | Unit | Effluent | Emission limit |
|---|---|---|---|
| pH | — | 6-9 | 6-9 |
| COD | ppm | ≤500 | 1,000 |
| Formaldehyde | ppm | ≤2 | 5 |
| $NH_3$—N | ppm | ≤5 | 50 |
| Total nitrogen content | ppm | ≤15 | — |
| Total phosphate | ppm | ≤2 | 5 |

Example 1. Regulation of Contents of COD and Formaldehyde in Acrolein Reactor Wastewater The acrolein reactor wastewater and the carbonate aqueous solution were mixed at a flow ratio of about 1:6, and the contents of COD and formaldehyde in the resulting mixed

TABLE 1-1

Composition of acrolein reactor wastewater used in the examples

| Composition | Acrolein (ppm) | Allyl alcohol (ppm) | Acrylic Acid (ppm) | Formaldehyde (ppm) | Acetic acid (ppm) | Maleic acid (ppm) |
|---|---|---|---|---|---|---|
| Acrolein reactor wastewater 1 | 1,800 | 150 | 75,000 | 16,000 | 7,500 | 5,000 |
| Acrolein reactor wastewater 2 | 918 | 623 | 84,734 | 16,148 | 7,620 | 4,774 |

TABLE 1-2

COD conversion coefficients for each component

| Composition | Acrolein | Allyl alcohol | Acrylic acid | Formaldehyde | Acetic acid | Maleic acid |
|---|---|---|---|---|---|---|
| COD conversion coefficient | 2 | 2.21 | 1.33 | 1.07 | 1.07 | 0.83 | solution were measured respectively. The changes in the composition in the mixing process were shown in Table 4.

TABLE 4

Changes in the composition in the mixing process

|  | Acrolein reactor wastewater 1 | After mixing with carbonate aqueous solution 1 |
|---|---|---|
| COD (ppm) | 133,028 | 20,482 |
| Formaldehyde (ppm) | 16,000 | 2,473 |
| pH | 1-2 | 4-5 |

And the wastewater subjected to anaerobic and aerobic biochemical treatment was used as dilution water to further adjust the contents of COD and formaldehyde in the resulting mixed solution and a pH value of the solution. The resulting mixed solution was mixed with diluted water at a flow ratio of about 3:1, and the contents of COD and formaldehyde in the resulting mixture were measured respectively, and the results were shown in Table 5.

TABLE 5

Changes in the composition in the mixing process

|  | Acrolein reactor wastewater | After mixing with carbonate aqueous solution 2 | After mixing with dilution water |
|---|---|---|---|
| COD (ppm) | 178,000 | 25,931 | 19,257 |
| Formaldehyde (ppm) | 16,000 | 2,270 | 1,675 |
| pH | 1-2 | 4-5 | 5-6 |

Example 2. Biochemical Treatment of Wastewater (1) Anaerobic Biochemical Treatment By mixing acrolein reactor wastewater with a carbonate aqueous solution or further mixing the acrolein reactor wastewater with treated reflowing wastewater, contents of COD and formaldehyde and a pH value were adjusted, wherein a COD concentration of the mixed solution was from 7,500 ppm to 25,000 ppm, a formaldehyde concentration was from 800 ppm to 4,000 ppm and the pH value was from 4 to 6, and the resulting mixed solution was conveyed to an anaerobic reactor for biochemical treatment, with alkalinity of the solution (calculated as $CaCO_3$) maintained between 2,000 ppm and 3,000 ppm. A loading rate of the anaerobic reactor was from 4 $kgCOD/m^3 \cdot d$ to 10 $kgCOD/m^3 \cdot d$; in the anaerobic treatment, organic matters (COD) were eliminated by reducing the COD to biogas under anaerobic conditions, with about 85% of the COD reduced to biogas consisting of $CH_4$, $CO_2$ and a very small amount of $H_2S$, wherein $CH_4$ had a mass fraction of about 75%, $CO_2$ had a mass fraction of about 25%, and $H_2S$ had a concentration of less than 200 ppm.

The anaerobic reactor comprises an anaerobic granular sludge bed based on granular sludge; the granular sludge had excellent characteristics, with settleability ranging from 10 m/hr to 100 m/hr, a sludge volume index ranging from 10 mL/g to 20 mL/g, a sludge concentration up to 50000 mgSS/L to 80000 mgSS/L, and activity up to 1 gCOD/gVSS·d to 1.5 gCOD/gVSS·d; consequently, the reactor could be operated at a loading rate ranging from 4 $COD/m^3 \cdot d$ to 10 $COD/m^3 \cdot d$. Removal rates of COD and formaldehyde were calculated based on the amounts of COD and formaldehyde in the liquid flows flowing into and out of the anaerobic granular sludge bed respectively.

(2) Aerobic Biochemical Treatment

The effluent from the anaerobic reactor overflowed into a subsequent aerobic biochemical tank. The solution subjected to aerobic biochemical treatment flowed into the sedimentation tank automatically to recirculate a part of sludge subjected to sedimentation separation to the aerobic biochemical tank, a certain amount of sludge was discharged into the discharging sludge tank, then the sludge cake was formed by centrifuging, and discarded so as to maintain a stable sludge concentration in the aerobic biochemical tank. Based on the amount of COD and formaldehyde in the effluent of the sedimentation tank, the removal rates of COD and formaldehyde were calculated respectively.

The data for the biochemical treatment of wastewater of Example 2 were described below.

When the COD of wastewater influent entering the anaerobic reactor was 15,980 mg/L, 83.5% COD was removed by the anaerobic reactor under the VLR of 5.32 gCOD/L·d, and the COD of final sedimentation tank effluent was 328 mg/L, and the total COD removal rate was 97.9%; formaldehyde removal efficiency was also high, up to 99.1% after anaerobic treatment (see Table 6).

When the COD of wastewater influent entering the anaerobic reactor was 15,250 mg/L, 83.9% COD was removed after anaerobic treatment, the COD of final sedimentation tank effluent was 298 mg/L and the total COD removal rate was 98.0%; the formaldehyde removal efficiency reached 99.1% after anaerobic treatment and was higher than 99.99% after further aerobic treatment (see Table 6).

TABLE 6

Contents of COD and formaldehyde in the liquid flow at each stage of wastewater treatment

| Sequence Number | Operating Conditions | | Feed influent | | Anaerobic effluent | | | | Sedimentation tank effluent (aerobic effluent) | | | |
|---|---|---|---|---|---|---|---|---|---|---|---|---|
|  | HRT (d) | VLR (g/Ld) | COD (mg/L) | FMD (mg/L) | COD (mg/L) | COD % (%) | FMD (mg/L) | FMD % (%) | COD (mg/L) | COD % (%) | FMD (mg/L) | FMD % (%) |
| 1 | 3 | 5.32 | 15,980 | 1,600 | 2,640 | 83.5 | 13.8 | 99.1 | 328 | 97.9 | / | / |
| 2 | 3 | 5.08 | 15,250 | 1,185 | 2,460 | 83.9 | 11.2 | 99.1 | 298 | 98.0 | <0.05 | 99.996 |

VLR = feed flow quantity $Q$ (L/d) × influent $COD$ (g/L)/reactor volume (L)

= influent $COD$ (g/L)/$HRT$ (d)

HRT is hydraulic retention time and refers to the average retention time of the sewage to be treated in the reactor, that is, the average reaction time of the sewage and microorganisms in the bioreactor;

FMD refers to formaldehyde content;
COD % refers to COD removal rate;
FMD % refers to formaldehyde removal rate;

COD %=[(influent COD−effluent COD)/influent COD]×100%;

FMD %=[(influent FMD−effluent FMD)/influent FMD]×100%.

Wherein, influent COD and influent FMD refer to the concentration of feed influent entering the anaerobic reactor.

Figure 5:
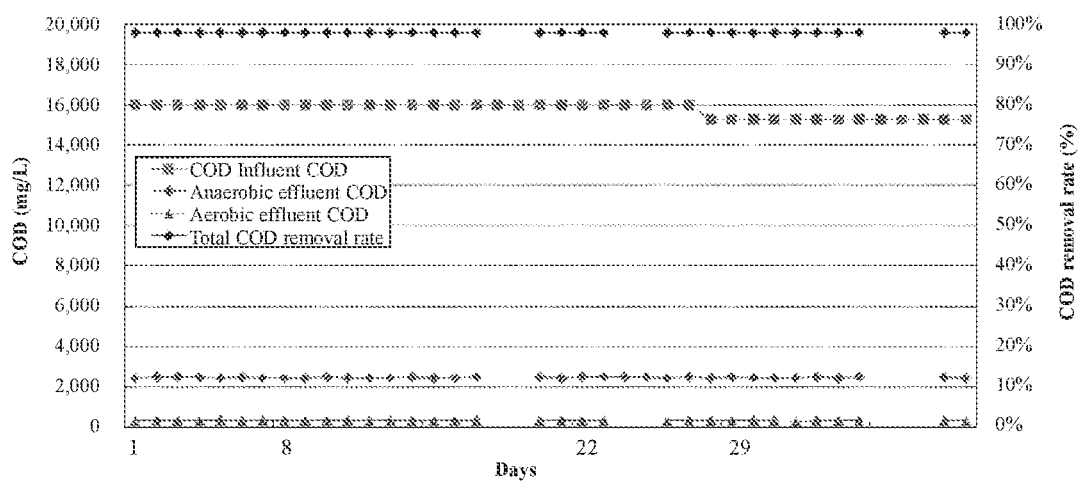
FIG. 5 is a graph showing COD and COD removal rates of influent and effluent according to one example of the present application.

FIG. 5 shows COD and its removal rate results for a multi-day continuous operation. Wherein, total COD removal rate, influent COD, anaerobic effluent COD and aerobic effluent COD are listed in the figure respectively from top to bottom. As can be seen, during the whole operation period, the effective removal of COD in anaerobic treatment and aerobic treatment can be realized, and the total COD removal rate is stable around 98%.

Table 7 shows the contents of COD and formaldehyde in the wastewater and removal rate results thereof under different conditions. It can be seen that in all the examples, effective removal of COD and formaldehyde can be achieved by anaerobic treatment and aerobic treatment, the total COD removal rate is stable above 98%, and the formaldehyde removal rates are all above 99.9%.

TABLE 7

Contents of COD and formaldehyde in the wastewater under different conditions and removal rate results thereof

| Sequence Number | Operating Conditions | | Feed influent | | Anaerobic effluent | | | | Sedimentation tank effluent | | | |
|---|---|---|---|---|---|---|---|---|---|---|---|---|
| | HRT (d) | VLR (g/Ld) | COD (mg/L) | FMD (mg/L) | COD (mg/L) | COD % (%) | FMD (mg/L) | FMD % (%) | COD (mg/L) | COD % (%) | FMD (mg/L) | FMD % (%) |
| 1 | 4.0 | 1.97 | 7880 | 2028 | 975 | 87.6 | 2.5 | 99.9 | 146 | 98.1 | 0.6 | 99.97 |
| 2 | 4.0 | 3.03 | 12100 | 3069 | 1640 | 86.4 | 5.6 | 99.8 | 210 | 98.3 | 0.4 | 99.99 |
| 3 | 3.5 | 3.86 | 13550 | 3480 | 1890 | 86.1 | 11 | 99.7 | 254 | 98.1 | 2.1 | 99.94 |
| 4 | 3.3 | 4.07 | 13550 | 3640 | 2010 | 85.2 | 11 | 99.7 | 250 | 98.2 | 2.3 | 99.94 |
| 5 | 3.0 | 4.47 | 13550 | 3640 | 2050 | 84.9 | 11 | 99.7 | 262 | 98.1 | 0.73 | 99.98 |
| 6 | 2.7 | 4.98 | 13550 | 3660 | 2060 | 84.8 | 21 | 99.4 | 250 | 98.2 | 1.1 | 99.97 |
| 7 | 2.7 | 4.98 | 13550 | 3534 | 2040 | 84.9 | 10 | 99.7 | 255 | 98.1 | 0.8 | 99.98 |
| 8 | 2.4 | 5.69 | 13550 | 3424 | 2150 | 84.1 | 11 | 99.7 | 254 | 98.1 | 0.6 | 99.98 |
| 9 | 2.2 | 6.10 | 13550 | 3465 | 2120 | 84.4 | 10.1 | 99.7 | 258 | 98.1 | 0.6 | 99.98 |
| 10 | 2.2 | 6.10 | 13550 | 3478 | 2140 | 84.2 | 9.9 | 99.7 | 252 | 98.1 | 0.5 | 99.98 |

As can be seen from the above examples, the effective removal of COD and formaldehyde in anaerobic treatment and aerobic treatment can be realized by mixing acrolein reactor wastewater with a carbonate aqueous solution or further mixing with treated reflowing wastewater, adjusting contents of COD and formaldehyde and pH value, then conveying the obtained mixed solution to an anaerobic reactor for biochemical treatment, and then performing biochemical treatment in an aerobic biochemical tank; and stable removal effects can be obtained through multi-day continuous operation multi-day. The treated wastewater meets the discharge standard.

It is to be noted that the above-mentioned examples are merely for the purpose of illustration and are not intended to limit the scope of the invention, and that equivalents or substitutions may be made thereto without departing from the scope of the invention.

The invention claimed is:

1. A method for treating acrolein reactor wastewater, comprising the steps of:
S1. mixing acrolein reactor wastewater and a carbonate aqueous solution to obtain a mixed solution, wherein the acrolein reactor wastewater has a pH value of less than 2 and contains 500 ppm to 3,000 ppm of acrolein, 50 ppm to 800 ppm of allyl alcohol, 40,000 ppm to 100,000 ppm of acrylic acid, 10,000 ppm to 30,000 ppm of formaldehyde, 3,000 ppm to 10,000 ppm of acetic acid and 3,000 ppm to 8,000 ppm of maleic acid; and
the mixed solution has a pH value ranging from 4 to 6, a chemical oxygen demand (COD) concentration ranging from 7,500 ppm to 30,000 ppm, and a formaldehyde concentration ranging from 800 ppm to 4,000 ppm;
S2. conveying the mixed solution obtained in step S1 to an anaerobic reactor for biochemical treatment; and
S3. conveying a solution treated in step S2 to an aerobic biochemical tank for treatment.

2. The method according to claim 1, wherein the acrolein reactor wastewater in step S1 contains salts in an amount of less than 50 ppm and contains sulfate in an amount of less than 30 ppm.

3. The method according to claim 1, wherein the carbonate aqueous solution in step S1 has a pH value between 8 and 9, a COD concentration between 100 ppm and 600 ppm, and an alkalinity, calculated as $CaCO_3$, between 4,000 ppm and 7,000 ppm.

4. The method according to claim 1, wherein the COD concentration of the mixed solution in step S1 is between 12,000 ppm and 25,000 ppm.

5. The method according to claim 1, wherein the formaldehyde concentration of the mixed solution in step S1 is between 1,200 ppm and 3,600 ppm.

6. The method according to claim 1, wherein an alkalinity, calculated as $CaCO_3$, of the mixed solution in step S1 is less than 3,000 ppm.

7. The method according to claim 1, wherein a COD concentration of the acrolein reactor wastewater in step S1 is between 60,000 ppm and 200,000 ppm.

8. The method according to claim 1, wherein the carbonate aqueous solution in step S1 contains at least one of sodium carbonate or sodium bicarbonate.

9. The method according to claim 1, wherein at least a part of a solution treated in at least one of step S2 or S3 is mixed with the mixed solution obtained in step S1 to obtain a mixture having a pH value in a range of 5 to 6.5, and then the mixture is conveyed to the anaerobic reactor in step S2 for biochemical reaction.

10. The method according to claim 1, wherein after step S2, a COD removal rate is 70% or more, and a formaldehyde removal rate is 98% or more.

11. The method according to claim 1, wherein step S2 comprises obtaining biogas containing $CH_4$ and $CO_2$, wherein the $CH_4$ has a mass fraction ranging from 70% to 90%, and the $CO_2$ has a mass fraction ranging from 10% to 30%.

12. The method according to claim 1, wherein after step S3, a COD removal rate is 95% or more, and a formaldehyde removal rate is 99.5% or more.

13. The method according to claim 1, wherein after step S3, a treated wastewater has a pH between 6 and 9 and contains less than 800 ppm of COD, less than 5 ppm of formaldehyde, less than 50 ppm of $NH_3$—N, less than 15 ppm of total nitrogen and less than 2 ppm of total phosphate.

14. The method according to claim 1, wherein a reaction temperature in step S2 is from 30° C. to 45° C. and a reaction temperature in step S3 is from 10° C. to 35° C.

15. The method according to claim 1, further comprising: reflowing at least one part of solution treated in at least one of step S2 or S3 to step S2.

16. A device for treating acrolein reactor wastewater, comprising a wastewater storage tank, a carbonate aqueous solution storage tank, a wastewater conditioning tank, an anaerobic reactor, an aerobic biochemical tank, a sedimentation tank, a secondary sedimentation tank, an exhaust pipe, and an anaerobic conditioning tank disposed between the wastewater conditioning tank and the anaerobic reactor, wherein
the wastewater storage tank and the carbonate aqueous solution storage tank are respectively in fluid communication with the wastewater conditioning tank,
the wastewater conditioning tank, the anaerobic reactor, the aerobic biochemical tank, the sedimentation tank and the secondary sedimentation tank are sequentially in fluid communication,
the anaerobic reactor is provided with a biogas outlet,
one or more of the wastewater storage tank, the carbonate aqueous solution storage tank, the wastewater conditioning tank, the anaerobic reactor, or the aerobic biochemical tank are provided with exhaust outlets connected to the exhaust pipe, and
the anaerobic conditioning tank is in fluid communication with an outlet of the wastewater conditioning tank and an inlet of the anaerobic reactor respectively, and in fluid communication with outlets of one or more of the anaerobic reactor, the aerobic biochemical tank, the sedimentation tank, or the secondary sedimentation tank.

17. The device according to claim 16, wherein at least one of
the anaerobic reactor comprises an anaerobic granular sludge bed and an anaerobic sludge tank, wherein the anaerobic granular sludge bed is in fluid communication with the wastewater conditioning tank and the aerobic biochemical tank, the anaerobic sludge tank is in fluid communication with the anaerobic granular sludge bed, the anaerobic granular sludge bed is provided with a biogas outlet, and the anaerobic sludge tank is provided with an exhaust outlet connected to the exhaust pipe, or
the aerobic biochemical tank is an aeration sludge bed.

18. The device according to claim 16, wherein
an outlet of the sedimentation tank is connected to an inlet of the aerobic biochemical tank via a pipe and a circulation pump.

19. The device according to claim 16, wherein at least one of a pH analyzer or a thermometer are disposed within the wastewater conditioning tank.

20. The device according to claim 16, wherein an outlet of the exhaust pipe is connected to at least one of a combustor, a filter, or a scrubber.

* * * * *